United States Patent [19]

Hutchison

[11] Patent Number: 5,528,044
[45] Date of Patent: Jun. 18, 1996

[54] WIPER ASSEMBLY FOR ULTRAVIOLET-LIGHT REACTOR TUBES

[75] Inventor: Joseph A. Hutchison, Dallas, Tex.

[73] Assignee: Solar Kinetics, Inc., Dallas, Tex.

[21] Appl. No.: 432,051

[22] Filed: Apr. 28, 1995

[51] Int. Cl.[6] ............................................. G01N 21/01
[52] U.S. Cl. .................................. 250/431; 250/436
[58] Field of Search .................................. 250/431, 435, 250/436; 422/24

[56] References Cited

U.S. PATENT DOCUMENTS 3,456,107  7/1969  Robertson ........................ 250/431
3,566,105  2/1971  Willtrout .......................... 250/435
4,922,114  5/1990  Boehme ........................... 250/436

*Primary Examiner*—Bruce C. Anderson
*Attorney, Agent, or Firm*—Crutsinger & Booth

[57] ABSTRACT

A wiper is provided for cleaning reactor tubes used in an ultraviolet-light reactor. The wiper has a circular opening sufficiently large to resiliently accommodate a reactor tube. A plurality of wipers can be connected to a wiper support to create a wiper assembly. A rod attached to the wiper assembly, or a wiper, can be moved from outside the reactor chamber for mechanically reciprocating the wiper assembly along the length of the reactor tube in the chamber, whereby, the wiper slides along the outer surface of the reactor tube to wipe off at least some of the fouling that may have accumulated on the outer surface of the reactor tube.

22 Claims, 3 Drawing Sheets

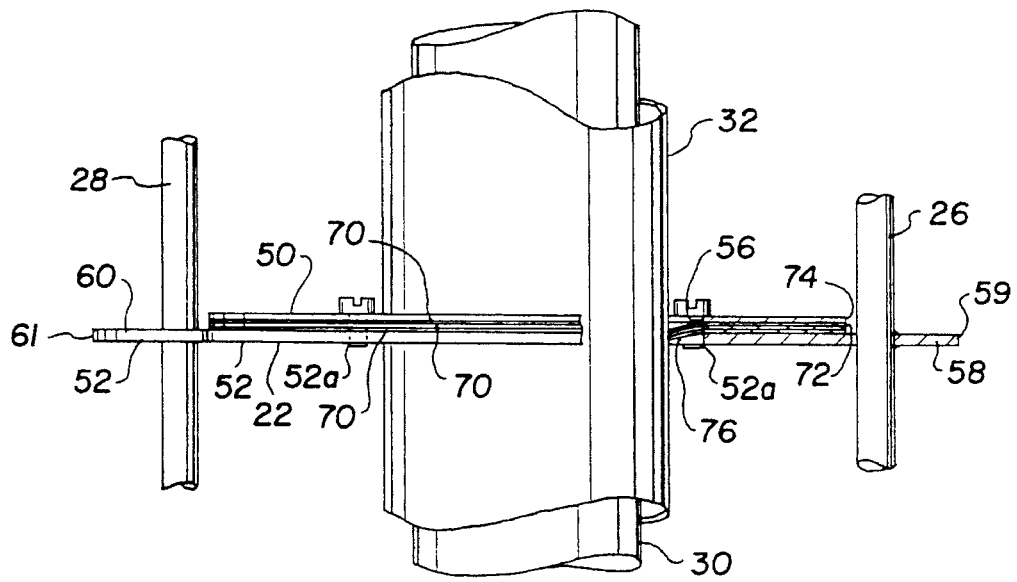
Fig. 3
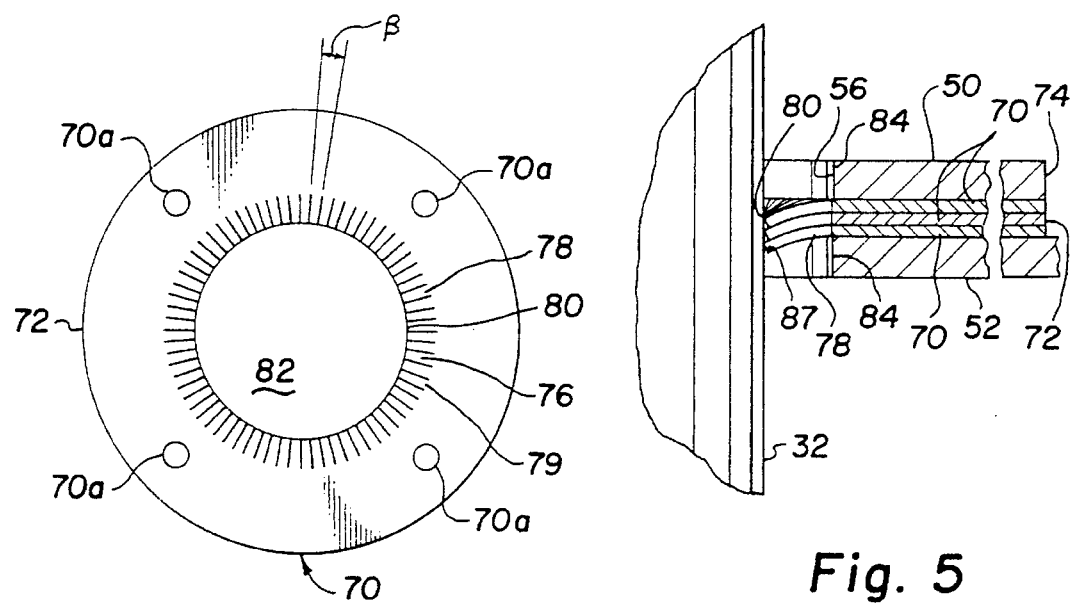
Fig. 4
Fig. 5

5,528,044

WIPER ASSEMBLY FOR ULTRAVIOLET-LIGHT REACTOR TUBES

TECHNICAL FIELD

This invention relates to a wiper assembly for removing fouling and scale build up from a reactor tube in an ultraviolet-light reactor.

BACKGROUND OF THE INVENTION

Ultraviolet light is a portion of the electromagnetic spectrum that has many uses. For example, ultraviolet light can be used in a purification system to kill bacteria and break down chemicals in a fluid, such as water or air. The ultraviolet radiation can convert chemicals in the water to carbon dioxide and water. If halogenated compounds are present, the ultraviolet radiation converts the compounds into halogenated acids. Ultraviolet light can also be used in photosynthetic reactions to initiate and cause chemical reactions to make chemical compounds. These ultraviolet-light initiated reactions can take place in a gas or liquid phase. To be effective, the fluid must be exposed to ultraviolet-light radiation of a certain minimum intensity for a certain minimum time. The minimum intensity and time required for a particular process is determined by routine experimentation and analysis. Generally, the more intense the ultraviolet-light radiation, the shorter the exposure time required for a given purification or reaction objective.

As is well known in the art, an ultraviolet lamp is typically made with a straight, hollow tube of UV (ultraviolet) light transparent material, typically quartz. The straight tube is sealed at both ends such that electrical connections extend through the seals into the tube. The tube is filled with a gas that is known to produce ultraviolet light when a sufficient electrical current passes through the gas.

To immerse an ultraviolet lamp in fluid, at least one end of the straight-tube lamp and its electrical connections is normally positioned below the surface level of the water. To protect the electrical connections of the lamp, it is normally positioned in a secondary sheath of ultraviolet transparent material. A suitable ultraviolet transparent material for the sheath is quartz, which is transparent to both ultraviolet and visible light and has some physical properties similar to glass. The quartz sheath of the reactor tube keeps water away from the lamp and its electrical connections.

An ultraviolet-light reactor typically includes a tank or other chamber for holding or circulating a fluid to be treated with ultraviolet radiation. An ultraviolet reactor tube comprising the lamp and its protective quartz sheath is positioned in the reactor chamber so that fluid in the chamber is exposed to the ultraviolet radiation. For example, U.S. Pat. No. 4,922,114, issued to Boehme, relates to a fluid photo reactor using ultraviolet ray water purifiers. The device has a stretch and fit design of flexible wiper rings to compensate for out of round and dimensional variation in the quartz tube.

Some ultraviolet-light reactors have a plurality of reactor tubes positioned in the chamber, which can provide intense ultraviolet radiation. Since the ultraviolet-light generating efficiency of a lamp gradually deteriorates with use, another purpose of the protective sheath is to allow a lamp to be periodically changed without opening the reactor chamber. In an ultraviolet-light reactor having a plurality of reactor tubes, the lamp of one reactor tube can be changed without interrupting the ultraviolet-light treatment provided by the other reactor tubes.

A problem with ultraviolet reactor tubes is that they tend to become fouled and accumulate scale. This problem is particularly acute in fluid treatment reactors. As fouling and scale accumulates on the outer surface of the reactor tube, it increasingly blocks the ultraviolet light from the lamp, which reduces the intensity and effectiveness of the ultraviolet-light treatment. To remove the fouling and scale, the protective sheath of the reactor tube has to be mechanically or chemically cleaned. Furthermore, the reactor tubes are often positioned in an ultraviolet-light reactor such that they are inaccessible for cleaning without at least partially dismantling the reactor. This is particularly so with a reactor that uses a plurality of reactor tubes arranged in a dense configuration in a chamber. For example, an ultraviolet-light reactor can have thirty reactor tubes in a single chamber. The necessary cleaning of the reactor tube to maintain the performance of the reactor has been time consuming and expensive. Furthermore, treatment devices that clean the reactor tubes with a flexible wiper ring lose elasticity qualities and degrade when exposed to the frictional cleansing, therefore causing a loss in effectiveness over time to clean the reactor tubes. Thus, there has been a long-felt need for an apparatus for cleaning the reactor tubes of an ultraviolet-light reactor that is effective and efficient for an extended period of time.

SUMMARY OF THE INVENTION

An apparatus is provided for cleaning accumulated fouling on one or more reactor tubes in an ultraviolet-light reactor chamber.

To solve the problem of fouling of a reactor tube while in the ultraviolet-light reactor, a wiper is provided. The wiper is adapted to be positioned inside the chamber of an ultraviolet-light reactor such that wiper slides along the length of the reactor tube to wipe or scrape off fouling accumulated on the tube.

In another aspect of the invention, a wiper assembly has at least two wipers interconnected by wiper supports. The wiper has a plurality of radially inward extending fingers that form an opening similar in shape to the cross section of the reactor tube but the opening is sufficiently large to allow the fingers to resiliently engage an outer surface of the reactor tube. The finger blades of the wiper are deflected such that the blades can resiliently engage the surface of a reactor tube positioned through the wiper opening. When the wiper is moved along the length of the reactor tube, the blade slides along the outer surface of the reactor tube, thereby wiping or scraping off any fouling that may have accumulated on the tube.

In a further aspect of the invention, a plurality of blade plates are secured together to increase the contact area between the blades and the reactor tube. The plates can be offset to further increase this contact area.

The reactor tube wiper is preferably integrally formed of a resilient material such as steel or the like. As used herein, the term resilient means the extent to which energy may be stored in the material by elastic deformation, the material having a limited elastic threshold sufficient to provide a spring-like force of the wiper against the reactor tube. Most preferably, the wiper is formed of a material that is resistant to ultraviolet light degradation, such as stainless steel. The wiper is also preferably adapted to be removably connected such that a worn wiper can be replaced with a new wiper.

The wiper assembly can be mechanically moved along the length of the reactor tube by a rod attached to the wiper assembly. For example, the wiper assembly can have a driver plate attached to a piston rod powered by a piston-cylinder assembly, or alternatively hand powered, for moving the assembly. The piston rod can be moved from outside the reactor for reciprocating the wiper assembly inside the reactor chamber. In the process of reciprocally moving the wiper assembly along the length of the reactor tube, the wiper cleans fouling from the reactor tube surface. Wiping the reactor tube is usually more effective if there is a liquid such as water in the reactor chamber. If desired, the removed fouling can be flushed from the chamber with a purge flow cycle. Cleaning of the reactor tube can be accomplished without dismantling the reactor.

These and other features, advantages, and objects of the present invention will be apparent to those skilled in the art upon reading the following detailed description of preferred embodiments and referring to the drawing.

BRIEF DESCRIPTION OF THE DRAWING

The accompanying drawing is incorporated into and forms a part of the specification to illustrate several examples of the present invention. The figures of the drawing together with the description serve to explain the principles of the invention. The drawing is only for the purpose of illustrating preferred and alternative examples of how the invention can be made and used and is not to be construed as limiting the invention to only the illustrated and described examples. The various advantages and features of the present invention will be apparent from a consideration of the drawing in which:

FIG. 3 is a partial cross-sectional illustration of a wiper blade in the second embodiment depicting the finger blade engagement as the wiper engages the reactor tube;

FIG. 4 is a top view of a finger blade plate;

FIG. 5 is an enlarged fragmentary side view of the finger blades as they engage the reactor tube surface and.

FIG. 8 is a perspective partially cut-away view of a reator chamber having a wiper assembly according to the invention operatively positioned therein.

DETAILED DESCRIPTION OF PREFERRED EMBODIMENT

Figure 1:
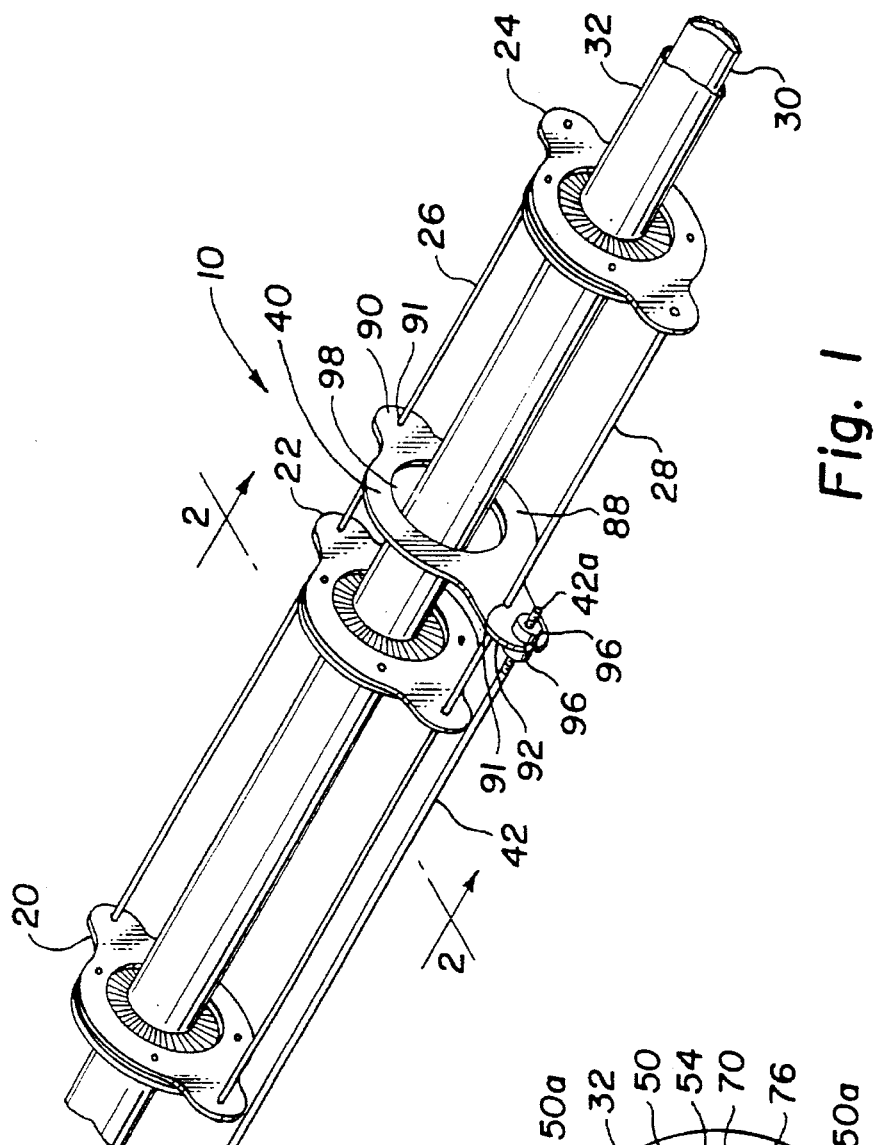
FIG. 1 is a perspective view of a wiper assembly with three wipers rigidly affixed to one another and drivable along the length of the reactor tube while the reactor tube is immersed in fluid.

The present invention will be described by referring to apparatuses and methods showing various examples of how the invention can be made and used. Like reference characters are used throughout the several views of the drawing to indicate like or corresponding parts.

Figure 6:
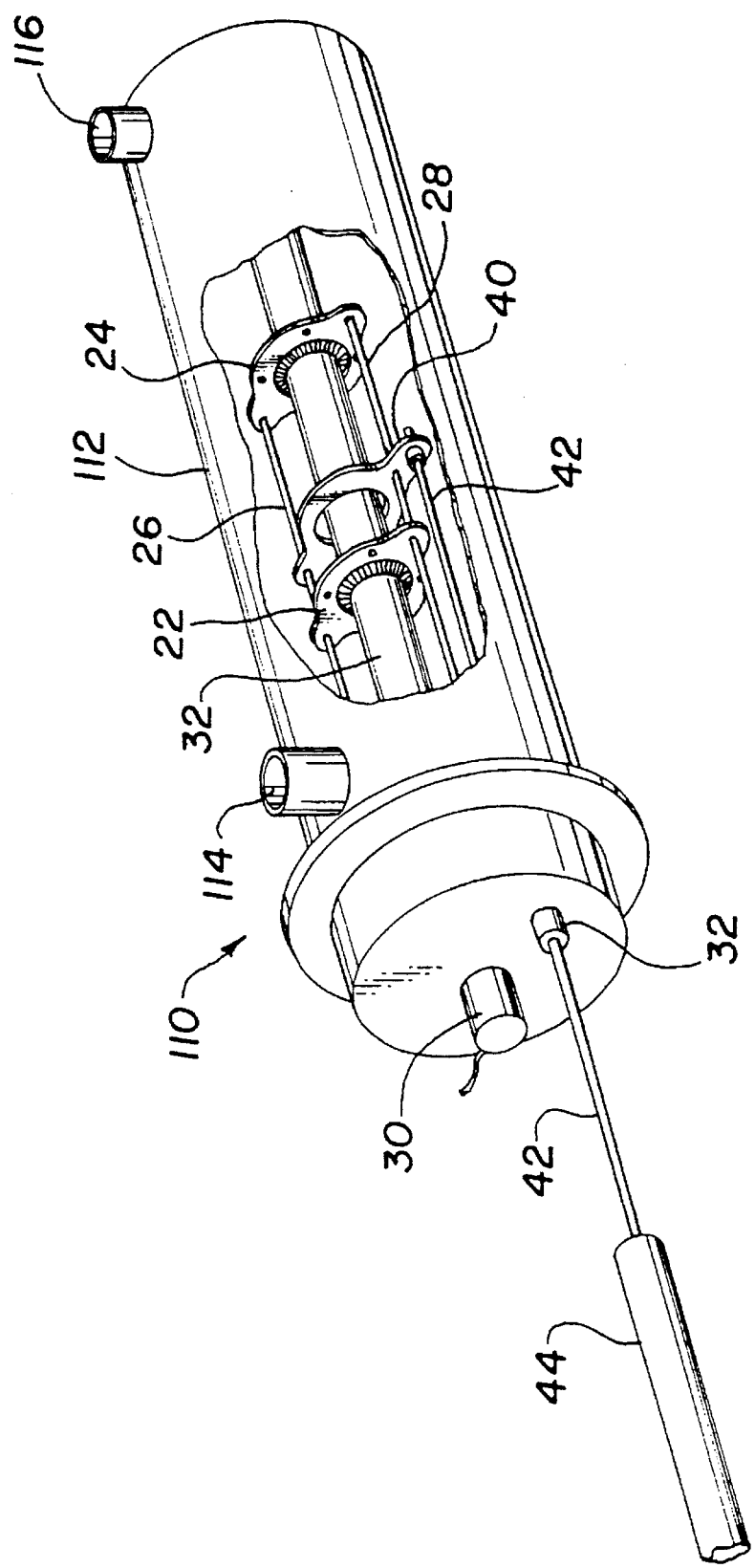

The invention pertains to a wiper assembly as shown in FIG. 1, which is referred to generally by the numeral 10. The wiper assembly 10 has three wipers 20, 22, and 24 interconnected by wiper supports 26 and 28. The wiper assembly 10 is engagingly disposed about a reactor tube 30 having a protective sheath 32. However, the wiper assembly is effective in a system without a protective sheath 32. The wiper assembly 10 has a central axis that generally aligns with the central axis of the reactor tube 30 and reactor tube sheath 32. The wiper assembly can be used while submerged in a reactor chamber. A general purpose reactor chamber 110 of the type that can be used with the wiper assembly is shown in FIG. 6.

The wiper assembly 10 has a driver plate 40 positioned between the wipers 22 and 24 and secured to the wiper supports 26 and 28. In turn, the driver 40 is connected to a piston 42 and a pneumatic cylinder 44.

Figure 2:
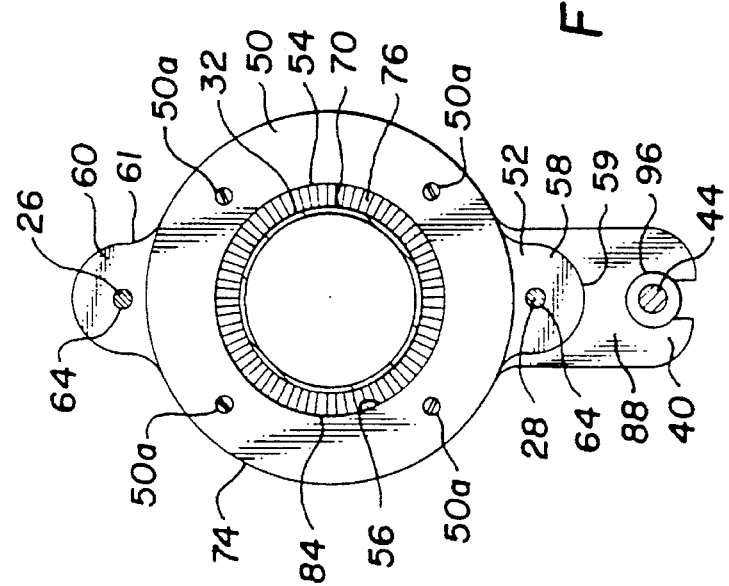
FIG. 2 is a top view of a wiper according to the invention.

Referring to FIGS. 2 and 3, the wipers 20, 22, and 24 each have two circular wiper retaining rings 50 and 52. For clarity of the illustration in FIGS. 2 and 3, a single wiper is illustrated. The retaining rings 50 and 52 each define an aperture 54 that is similar in shape to the cross-section of the reactor tube 30 but larger. This feature creates an edge 56 that is distal from the reactor tube sheath 32 when the center axes of the retaining ring aperture 54 and of the reactor tube sheath 32 are aligned.

Referring to FIG. 5, the bottom retaining ring 52 has two integrally formed ears 58 and 60 having generally semi-circular outer edges 59 and 61 extending from opposite sides of the ring 52. Each ear 58 and 60 has an off-center hole 64 near the outer periphery of retaining ring 52 to mount the wipers to the wiper supports 26 and 28.

A finger blade plate 70, illustrated in FIG. 4, is positioned between the wiper retaining rings 50 and 52. For clarity of the illustration in FIG. 4, only one finger blade plate 70 is shown in detail. A varying number of finger blade plates 70 may be stacked between the retaining rings 50 and 52, but preferably for the disclosed device, three finger blade plates 70 are used, as best shown in FIGS. 3 and 5. As should be readily apparent to those skilled in the art, the plates can be stacked offset relative to each other to increase the contact area between the wiper and the reactor tube for improved cleaning of the reactor tube sheath 32.

Each plate 70 is integrally formed of a resilient material with good mechanical properties and chemical resistance such as plastic or stainless steel. As used herein, the term resilient means the extent to which energy may be stored in the material by elastic deformation, the resilient material having a limited elastic threshold to provide a spring-like force of the plate against the reactor tube sufficient to fulfill the wiper function of wiping or scraping fouling off the reactor tube surface. The plate 70 can be formed using conventional techniques that are well known to those skilled in the art. The finger blade plates 70 have a thickness between about 0.10 to about 0.20 millimeters. Preferably, the thickness of the plate is 0.15 millimeters. It should be noted that the thickness of the finger blade plates can vary with use of other resilient materials.

As illustrated in the drawing, the finger blade plates 70 have an outer radial edge 72 which generally coincides with the outer radial edges 74 of the retainer rings 50 and 52, as best shown in FIG. 5. The finger blade plates 70 have a plurality of inwardly extending finger blades 76. Preferably, a finger blade plate 70 has seventy-two radially extending finger blades 76 placed at an angle β of five degree radial increments, as best shown in FIG. 4. However, as should be readily apparent to those skilled in the art, the number and ratio can be adjusted to accommodate differing dimensional forms and sizes of reactor tubes or other similarly shaped devices.

Each finger blade 76 has a base portion 78 and a tip portion 80 that when combined with the other finger blades 76 define a finger blade plate aperture 82 that is similar in shape to the cross-section of the reactor tube 30 but smaller. The inner circumference of the finger blade aperture 82 is sufficiently less than the outer circumference of the reactor tube sheath 32. As illustrated in FIG. 5, the finger blade tips 80 terminate in a generally square surface profile having an edge 87. The finger blade tips 80 can be shaped to have arcuate profiles to limit cleaning of the reactor tube 30 to simply a wiping action. The finger blade tips 80 can be further configured to vary the intensity with which the reactor tube 30 is cleaned. A plurality of holes 70a are defined in the finger blade plate 70 for assembly detailed later.

The resilient finger blades 76 radially protrude into the retaining ring aperture 54 of the retaining rings 50 and 52. The retaining rings 50 and 52 form a reinforced fulcrum 84 at the base 78 of the finger blades 76 such that about twenty percent of the finger blade length is encased by the reinforced fulcrum 84, as best shown in FIG. 5.

A plurality of holes 50a and 52a, respectively, are defined in the bodies of the retaining rings 50 and 52. A plurality of corresponding holes 70a are defined in the finger blade plate 70. Referring to FIG. 2, the wiper is assembled by sandwiching the finger blade plates 70 between the retaining rings 50 and 52. As should be apparent to those skilled in the art, a screw and prethreaded holes, a bolt and nut, or other securing device, may be used to secure the stacked assembly into a unit comprising either of wipers 20, 22, or 24.

Referring to FIG. 1, the wipers 20, 22, and 24 are rigidly connected about the reactor tube sheath 32 by wiper supports 26 and 28, which are generally of a cylindrical rod shape made of a rigid durable material such as stainless steel. Wipers 20 and 24 are secured on opposite ends of the wiper supports 26 and 28. Wiper 22 is secured generally central to the ends of the wiper supports 26 and 28.

Rigidly connected to the wiper supports 26 and 28 between the wipers 22 and 24 is a driver plate 40 as illustrated in FIG. 1. It should be readily apparent to those skilled in the art that, the driver may be attached between wipers 20 and 22, respectively, to achieve the same result. Preferably the driver plate 40 is mounted near the centrally located wiper 22 rather than to the end wipers 20 or 24 to better distribute the force exerted on the wiper assembly 10.

Referring to FIG. 2 and 3, the driver 40 has a generally radial body 88 with a first ear 90 integrally formed on an edge of the radial body 88. The ear 90 has an aperture 91 to accept a wiper support 26 or 28. On an opposite side of the driver 40 is a forked ear 92 integrally formed with the driver body 88. The forked ear 92 has an aperture 91 to accept a wiper support 26 or 28. As best shown in FIG. 1, a centrally located enlarged aperture 98 generally coincides with the retaining ring apertures 54 of the retainer rings 50 and 52.

As illustrated in FIGS. 1 and 2, the forked ear 92 of the driver 40 accepts a threaded end 42a of a rod 42. The rod is preferably made of a rigid durable material such as stainless steel or steel alloy. The threaded rod end 42a of the rod 42 is secured in the forked ear 92 by a pair of grooved nuts 96 with the forked ear 92 positioned between the grooved nuts 96. Each grooved nut 96 is opposingly tightened so that the forked ear 92 of the driver 40 is clenched between the face surfaces of the grooved nuts 96. In an alternative embodiment, the rod can be similarly attached directly to a centrally positioned wiper such as wiper 22.

The other end 42b of the rod 42 is connected to a pneumatic cylinder 44 located outside the reactor chamber 110, as shown in FIG. 6. The pneumatic cylinder 44 can be either a gas medium or a fluid medium cylinder. As shown in FIG. 6, a the reactor chamber 110 consists of a cylindrical housing 112 with an inlet 114 for fluid to be purified and an outlet 116 for the fluid. The housing 112 has an opening 132 for piston 42 passing into the housing 112. As shown, the reactor tube 30 in a sheath 32 provides the source of UV for the purification of the fluid. The wiper assembly 10 is disposed around the reactor tube sheath 32. To limit contaminants in the treatment area, gas driven pneumatic cylinders are preferred. As also should be readily apparent to those skilled in the art, the wiper assembly 10 may operated without a pneumatic cylinder, allowing manual operation of the wiper assembly.

Referring to FIG. 1, the wiper assembly 10 can be moved along the length of the reactor tube sheath 32 from a stowed position near the top of the sheath 32. When a wiper 20 is moved along the reactor tube, the wiper finger blades 76 slide along the outer surface of the reactor tube sheath 32 while wiping or scraping off any fouling that may have accumulated on the reactor tube. The present embodiment allows the finger blade tips 80 to follow slight irregularities in the diameter and roundness of the reactor tube 30, or reactor tube sheath 32, to ensure adequate wiper-to-tube contact.

Shown in FIG. 5, the finger blades 76 engage the outer surface of the reactor tube sheath 32, causing the corner edges of the finger blades 76 to contact the outer surface of the reactor tube sheath 32. The amount of three exerted by the finger blades 76 against the reactor tube sheath 32 is sufficient for effective scraping while minimizing a tendency to craze or etch the reactor tube sheath surface.

The pneumatic cylinder 44 or similar device urges the wiper assembly 10 along the reactor tube 30 until it reaches a position near the end of the cleansed reactor tube 30. This operation can be repeated in an opposite direction by retracting the wiper assembly 10 along the length of the reactor tube 30 or reactor tube sheath 32.

The description and figures of the specific examples above do not point out what an infringement of this invention would be, but are to provide at least one explanation of how to make and use the invention. Numerous modifications and variations of the preferred embodiments can be made without departing from the scope and spirit of the invention. Thus, the limits of the invention and the bounds of the patent protection are measured by and defined in the following claims.

Having described the invention, what is claimed is:

1. A wiper for cleaning accumulated fouling on a reactor tube, the wiper comprising:

a first and a second retaining ring, each said retaining ring having an enlarged opening sufficient to surround but insufficient to engage the reactor tube; a plate positioned between said first and second retaining rings, said plate having a plurality of radial inwardly extending finger members protruding past the enlarged opening of said first and second retaining rings to engage an outer surface of the reactor tube; and a rigid rod attached to said first retaining ring for moving said plate having a plurality of finger members along the length of the reactor tube to clean at least some of the accumulated fouling that may have accumulated on the reactor tube.

2. The wiper of claim 1, wherein said wiper further comprises a pneumatic cylinder attached to said rod, said pneumatic cylinder imparting a longitudinal force to said rod.

3. The wiper of claim 2, wherein said pneumatic cylinder is a gas medium cylinder.

4. The wiper of claim 1, wherein said fingers resiliently engage the reactor tube surface to effect scraping of the reactor tube while minimizing crazing of the reactor tube surface.

5. The wiper of claim 4, wherein at least said plate is made of steel.

6. The wiper of claim 5, wherein said fingers are from about 0.10 to about 0.20 millimeters thick.

7. The wiper of claim 5, wherein said fingers are about 0.15 millimeters thick.

8. The wiper of claim 1, wherein a plurality of said plates are positioned between said retaining rings.

9. The wiper of claim 8, wherein said plates are positioned radially offset relative to each other for generating an increased contact area between said plates and the reactor tube.

10. The wiper of claim 1, wherein a tip of said plurality of radial inwardly extending fingers has a square profile having an edge.

11. The wiper of claim 10, wherein an edge of said tip engages the reactor tube surface.

12. The wiper of claim 1, wherein a tip of said plurality of radial inwardly extending fingers has an arcuate profile.

13. Apparatus for cleaning accumulated fouling on a reactor tube positioned in a chamber of an ultraviolet-light reactor, the apparatus comprising:

at least two wipers, each said wiper having an opening having a plurality of finger blades radially extending inward towards the reactor tube, said finger blades having edges which resiliently engage a surface of the reactor tube;

a wiper support for supporting and distally spacing said wipers about the reactor tube; and means for moving said wipers while in the reactor chamber, whereby when the wipers are moved along the length of the reactor tube, said finger blades resiliently slide along the outer surface of the reactor tube, thereby wiping off at least some of the fouling that may have accumulated on the outer surface of the reactor tube.

14. The apparatus in claim 13, wherein said moving means comprise:

at least one rod connected to said wipers extending outside the reactor chamber for sliding said wipers along the length of the reactor tube in the reactor chamber.

15. The apparatus in claim 14, wherein said rod is a slide rod having a knob, whereby a person can grasp the knob of the slide rod, and by moving the slide rod, move the wipers within the reactor chamber along the length of the reactor tube to clean the reactor tube.

16. The apparatus in claim 14, wherein said moving means further comprise:

a pneumatic cylinder attached to said rod to impart a longitudinal force to said wipers through said rod; and a controller electrically connected to said pneumatic cylinder for remotely and periodically activating said pneumatic cylinder for moving said wipers along the length of the reactor tube.

17. The apparatus in claim 16, wherein said pneumatic cylinder is a gas medium cylinder.

18. The apparatus in claim 13, wherein said wiper is formed of steel.

19. The wiper of claim 18, wherein said fingers are from about 0.10 to about 0.20 millimeters thick.

20. The wiper of claim 18, wherein said fingers are about 0.15 millimeters thick.

21. The wiper of claim 13, wherein the wiper is adapted to be removably connected to the wiper support such that a wiper can be replaced with a new wiper.

22. A combination comprising:

a reactor having a chamber therein;

at least one reactor tube in said reactor chamber; and a cleaner apparatus disposed about said at least one reactor tube, said apparatus comprising:

a first and a second retaining ring, each said retaining ring having an enlarged opening sufficient to surround but insufficient to engage the reactor tube;

a plate positioned between said first and second retaining rings, said plate having a plurality of radial inwardly extending finger members protruding past the enlarged opening of said first and second retaining rings to engage an outer surface of the reactor tube; and a rigid rod with a first end attached to said first retaining ring and a second end extending from the chamber to an exterior of said reactor for moving said fingers along the length of the reactor tube to clean at least some of the accumulated fouling that may have accumulated on the reactor tube.

\* \* \* \* \*

UNITED STATES PATENT AND TRADEMARK OFFICE
CERTIFICATE OF CORRECTION

PATENT NO.    : 5,528,044

DATED         : June 18, 1996

INVENTOR(S)   : Joseph A. Hutchison

It is certified that error appears in the above-identified patent and that said Letters Patent is hereby corrected as shown below:

In Column 3, line 44 change "FIG. 8" to --FIG. 6--;

In Column 6, line 23 change "three" to --force--; and

Signed and Sealed this

Twenty-seventh Day of May, 1997

Attest:

BRUCE LEHMAN

Attesting Officer

Commissioner of Patents and Trademarks